(12) United States Patent
Vu et al.

(10) Patent No.: US 10,822,572 B2
(45) Date of Patent: Nov. 3, 2020

(54) PROCESS OF PRODUCING BASIC BIOSOLVENTS USING HETEROGENEOUS CATALYSTS AND OBTAINED BASIC BIOSOLVENTS BY THIS PROCESS

(71) Applicant: Thu Ha Thi Vu, Hanoi (VN)

(72) Inventors: Thu Ha Thi Vu, Hanoi (VN); Anh Tai Pham, Hanoi (VN); Thanh Hang Thi Tran, Hanoi (VN)

(73) Assignee: National Key Laboratory For Petrochemical and Refinery Technnologies, Hanoi (VN)

( * ) Notice: Subject to any disclaimer, the term of this patent is extended or adjusted under 35 U.S.C. 154(b) by 0 days.

(21) Appl. No.: 16/383,575

(22) Filed: Apr. 13, 2019

(65) Prior Publication Data

US 2019/0241837 A1 Aug. 8, 2019

(30) Foreign Application Priority Data

Dec. 5, 2018 (VN) .............................. 1-2018-05484

(51) Int. Cl.
*C11C 3/10* (2006.01)
*C11C 1/00* (2006.01)
*C11B 13/00* (2006.01)

(52) U.S. Cl.
CPC ................ *C11C 3/10* (2013.01); *C11B 13/00* (2013.01); *C11C 1/002* (2013.01)

(58) Field of Classification Search
CPC ............ C11C 3/10; C11C 1/002; C11B 13/00
USPC ........................................................ 554/169
See application file for complete search history.

*Primary Examiner* — Deborah D Carr
(74) *Attorney, Agent, or Firm* — BN IP-Consulting LLC; Binh-An Nguyen

(57) ABSTRACT

The present invention relates to a process for the production of basic biosolvents derived from inedible vegetable oil or animal fat or waste fatty acid composition by one-pot reaction between inedible vegetable oil or animal fat or waste fatty acid, and at least one ester of short-chain organic acid having 2, 3 or 5 carbon atoms, derived from biomass, in the presence of heterogeneous catalysts. In addition, the invention also relates to basic biosolvents, comprising alkyl esters of fatty acid, trieste of glycerin, esters of short-chain organic acids having 2, 3 or 5 carbon atoms, suitable for preparing many types of biosolvents, depending on application requirements.

19 Claims, No Drawings

PROCESS OF PRODUCING BASIC BIOSOLVENTS USING HETEROGENEOUS CATALYSTS AND OBTAINED BASIC BIOSOLVENTS BY THIS PROCESS

FIELD OF THE INVENTION

The present invention relates to a process for the production of basic biosolvents from vegetable oil or animal fat or waste fatty acid, using a heterogeneous catalyst, operating continuously or semi-continuously, in order to obtain a biosolvent consisting of alkyl esters of fatty acids, esters of glycerol, esters of short-chain organic acids having 2 or 3 or 5 carbon atoms. At the same time, this patent also mentions the basic biosolvents.

BACKGROUND OF THE INVENTION

Replacing fossil solvents originated from petroleum with solvents derived from biomass, also called biosolvents, is a trend highly gaining attraction in the world for their advantages, which are ability of dissolving well and of overcoming most of the disadvantages of fossil solvents.

Among the biosolvents studied and applied, biosolvents based on alkyl esters of fatty acids, alkyl esters of short-chain organic acids, esters of glycerin, as well as their mixtures, own the potential of being most widely applied. These esters can be produced by environmentally friendly processes by using renewable and non-competitive feedstock against food.

Some of the processes for the production of biosolvent systems include the esterification of a short-chain organic acid derived from biomass and alcohol, in the presence of an acid catalyst and an extraction solvent, which is a mixture of alkyl esters of fatty acids, to shift the equilibrium of the ester reaction to the right.

This process is referred to in documents such as: Nadine Essayem, Gilbert Sapaly, Vu Thi Thu Ha, Nguyen Thi Thu Trang, Nguyen Thi Thuy Ha, "Method for obtaining biosolvent compositions by esterification and resulting biosolvent compositions", FR 2 957 075 B1, 2012; U.S. Pat. No. 9,255,218 B2, 2016; BR112012022330 A2, 2017; EP 2 542 520 B1, 2018; Thu Ha Thi Vu, Hang Thi Au, Thuy Ha Thi Nguyen, Thu Trang Thi Nguyen, Manh Hung Do, Ngoc Quynh Bui, Nadine Essayem, "Esterification of lactic acid by catalytic extractive reaction: A efficient way to produce a biosolvent composition", Catal. Lett., 143 (9) (2013) 950-956.

Accordingly, the reaction takes place in a liquid two-phase system consisting of a polarization phase containing components of the esterification reaction and an extraction solvent phase which is methyl ester of the fatty acid (added to the reaction mixture). Ethyl lactate is more soluble in the extraction solvent than in other components in the reaction mixture, significantly increasing the yield of ethyl lactate. After 6 h of reaction, for homogeneous $H_2SO_4$ catalyst and heterogeneous Amberlyst 15, the yield of ethyl lactate reached 80% while this value for heterogeneous catalyst KPW, after 2 h of reaction, was higher.

On the other hand, as mentioned above, in practice, the methyl ester of fatty acids is usually chosen to mix with ethyl lactate to form a biosolvent. Thus, adding methyl ester of fatty acid to esterification can not only increase the reaction efficiency by continually extracting ethyl lactate into the methyl ester phase of fatty acids, but also produce biosolvents by one step only. However, this method still has the disadvantage of performing at normal pressure and ethylene lactate yields at best, reaching the highest of around 86%. In addition, due to taking place in interrupted reaction devices, the process might face many obstacles. Amberlyst 15 catalyst is unstable at high temperatures and can only work at temperature below 120° C. KPW catalyst is a costly heteropoly acid catalyst and has only been studied at laboratory scale. At the same time, after the reaction is complete, the catalyst, the residual reactants, which is lactic acid, and water need to be separated.

In addition, there have been no publications concerning the application of mixtures consisting of alkyl esters of short-chain organic acids, including ethyl lactate, methyl ester of fatty acids and trieste glycerides of short-chain organic acids having 2, 3 or 5 carbon atoms, to make the basic biosolvents.

Therefore, it is necessary to invent the process of preparing eco-friendly and highly economically efficient basic biosolvents composed of many components, with simple yet effective reaction process, utilizing materials from biomass and/or waste materials, non-competitive feedstock against food. Specifically, in this reaction process, both new products and reactants themselves (residuals/excess) are biosolvents. Therefore, to obtain the product, it is not necessary to separate the residual reagent from the mixture after the reaction. From the basic biosolvents, it is possible to prepare a variety of biosolvents of various compositions, depending on the application requirements, by adding a specified volume of one or more ingredients, to adjust the mass ratio of the components in the basic biosolvents.

SUMMARY OF THE INVENTION

The purpose of the present invention is to provide a process for the production of basic biosolvents based on inedible vegetable oil or animal fat or a waste fatty acid composition, which is simple, effective and environmentally friendly.

Another purpose of the invention is to propose basic biosolvents comprising an alkyl ester of a fatty acid, an ester of glycerin, an ester of a short-chain organic acid having 2 or 3 or 5 carbon atoms. This basic biosolvents can be mixed with other ingredients to create a variety of biosolvents that are safe for ecology and human health and can be applied in areas such as printing, paint, asphalt, pesticides, industrial and civil hygiene, etc.

To achieve this aim, the invention provides a process for the production of basic biosolvents based on inedible vegetable oil and animal fat or waste fatty acid composition comprising the steps of:

Mixing the liquid material with one of the reactants, which is an alkyl ester of the short-chain organic acid of 2, 3 or 5 carbon atoms, derived from biomass, in the mixer. The mixing ratio by volume of alkyl ester/oil, inedible vegetable oil and animal fat or waste fatty acid composition ranges from around 2:10 to 6:10. In certain cases, it is possible to add water, if necessary, to the mixer.

Conducting one-pot reaction, including inter-esterification reactions, or simultaneous inter-esterification reactions with hydrolysis and esterification reactions, in the presence of a heterogeneous catalyst at temperatures between 220° C. to 240° C. and pressure in the range of 4.5-5.0 MPa.

Removing water and by-product, which is short-chain organic acids with 2, 3 or 5 carbon atoms and components with low boiling point, in order to obtain components of high boiling point, which are basic biosolvents.

In addition, the invention also provides a biosolvent system comprising an alkyl ester of fatty acid, an ester of glycerin, an ester of short-chain organic acid having 2 or 3 or 5 carbon atoms. This biosolvent system can be formulated into a variety of biodegradable solvents of various compositions, depending on the application requirements, by adding a specified volume of one or more ingredients to adjust the proportions of quantities of components in the basic bio solvents.

DETAILED DESCRIPTION OF THE INVENTION

The term "basic biosolvents" as used in this patent means that the system is a mixture of alkyl esters of fatty acids, trieste glycerin, esters of short-chain organic acids having 2, 3 or 5 carbon atoms, derived from biomass. From the basic biosolvents, it is possible to prepare a variety of biological solvents of various compositions, depending on the application requirements, by adding a specified volume of one or more ingredients, to adjust the mass ratio of the components in the basic biosolvents.

The term "inedible vegetable oil and animal fat" as used in the present invention means used oil and fat, obtained from inedible oil seeds, inedible fat of fish, containing less than 3% free fatty acid.

The term "waste fatty acid composite" as used in this patent means a mixture containing free fatty acids, ranging from 55% to 100%, obtained from the refining of vegetable oil.

The term "ester of glycerin" as used in the present invention is trieste of glycerin, including glycerol triacetate (also known as triacetin), glycerol trilactate, glycerol trilevulinate.

The term "alkyl esters of short-chain organic acids having 2, 3 or 5 carbon atoms derived from biomass" as used in the present invention comprises esters, methyl or ethyl of acetic acid, lactic acid, levulinic acid, etc. such as methyl acetate, ethyl acetate, ethyl lactate, ethyl levulinate. These esters are made up of esterification reactions of alcohols (methanol, ethanol) with corresponding acids (acetic, lactic, levulinic) derived from biomass, for example, methanol produced from biogas, ethanol produced from biomass containing cellulose, acetic acid, lactic acid, levulinic acid produced from biomass containing cellulose.

The term "heterogeneous catalyst" as used in this patent means that the KEYCAT-01 solid catalyst is formed by dissolving the ore of pyrolusite, which in this ore $MnO_2$ was reduced to MnO, into a 20% $H_2SO_4$ solution at 100° C.; removing insoluble impurities, then precipitating filtration with 15% $NaHCO_3$ solution; subsequently, drying and precipitating at 600° C. for 2 h; pressing 1 cm in diameter by extruder, drying at 80° C. and heat-treating at 950° C., in air stream. The resulting catalyst was analyzed as a percentage by mass of the elements, including Mn 36.8%; Si 6.05%; Fe 10.36%; Al 1.2%; O 32.6%.

The term "sub-critical reaction condition" as used in this patent means that high pressure and high temperature conditions are asymptotic to the critical value of a reagent in a reactor, specifically, an alkyl ester of short-chain organic acids having 2, 3 or 5 carbon atoms, derived from biomass. The alkyl esters of short-chain organic acids having 2, 3 or 5 carbon atoms, derived from biomass, at sub-critical state are considered to be boiling in liquid state. In this state, the dispersive capacity of alkyl esters of short-chain organic acids having 2, 3 or 5 carbon atoms, derived from biomass, into inedible vegetable oil or animal fat or waste fatty acid composition, as well as the reactivity of these materials together, significantly increased, contributing to the speed of reaction, leading to a reduction in reaction time compared to conventional reaction conditions, while equivalent performance is achieved.

The term "one-pot reaction process" as used in this invention means that many chemical reactions occur in one reaction device only, namely, the inter-esterization reaction taking place simultaneously with the reaction hydrolysis and esterification, to produce the desired product.

The process of the production of a biosolvent system involves heating for liquefying inedible vegetable oil or animal fat or waste fatty acid composition, then mixing with at least one alkyl ester of short-chain organic acid having 2, 3 or 5 carbon atoms, derived from biomass; and optionally adding water, proceeding to one-pot reaction in a continuous flow reactor containing fixed-layer heterogeneous catalysts; excluding acidic products having 2, 3 or 5 carbon atoms such as acetic acid, lactic acid or levulinic acid, water and components with low boiling point from the reaction mixture and obtaining product of the basic biosolvents.

The heating step for liquefying inedible vegetable oil or animal fat or waste fatty acid composition is carried out at a temperature in the range of 45 to 110° C., more suitably in the range of 50 to 100° C., most suitably in the range of 55 to 95° C. If the liquid temperature is too low, it will not be able to provide sufficient heat to liquefy waste fatty acid, while excessive temperature will cause heat loss.

Inedible vegetable oil and animal fat, whose main constituent is triglyceride, always contain a small amount of free fatty acid, but not more than 3%. In contrast, waste fatty acid composition, which is mainly derived from cooking oil refining process, has a very high free fatty acid content, ranging from 55 to 100%. The rest of the waste fatty acid composition is oil, and fat—triglyceride. At the same time, inedible vegetable oil or animal fat or waste fatty acid composition may contain a certain amount of water. Basically, water and oil or fatty acids are insoluble. However, in the cases of poor sources, water is often mixed in oil, fat or free fatty acids during processing and manufacturers do not want to separate the water thoroughly before selling vegetable oil or animal fat or waste fatty acid composition for customers. Therefore, the water content in these sources can be up to 0.5%.

Inedible vegetable oil or animal fat or waste fatty acid composition are non-competitive sources against food, yet sold at competitive prices. Vegetable oil or animal fat or waste fatty acid composition are directly used in the reaction without any other treatment, because all ingredient are inedible, or the above-mentioned fatty acid composition, consisting of triglyceride, free fatty acid, water, will take part in reaction to directly or indirectly produce the basic bio solvents.

Step of mixing of one of the alkyl esters of short-chain organic acid having 2, 3 or 5 carbon atoms, derived from biomass, with inedible vegetable oil or animal fat or waste fatty acid composition is carried out at a rate of alkyl esters/vegetable oil or animal fat or waste fatty acid composition preferably in the range of 1:10 to 9:10, more preferably within 2:10 to 8:10, most preferably within 2:10 and 6:10.

The addition of water to the raw material mixture is carried out at a rate of water/inedible vegetable oil or animal fat or waste fatty acid composition after replenishment preferably between 1:10 and 4:10, more preferably between 1:10 and 3:10, most preferably between 1:10 and 2:10. The mixture was then reacted in a reactor with the presence of KEYCAT-01 heterogeneous catalyst at high temperature and high pressure.

The reaction temperature is preferably in the range of 190° C. to 260° C., more preferably in the range of 200° C. to 250° C., more suitably in the range of 210° C. to 240° C., most suitably in the range of 220° C. to 240° C.

The reaction pressure is preferably in the range of 2.5 to 6.5 MPa, more preferably in the range of 3.0 to 6.0 MPa, more suitably in the range of 3.5 to 5.5 MPa, most suitably is in the range 4.5 to 5.0 MPa.

The total retention time of the reaction mixture in the reactor is preferably in the range of 2 to 8 hours, more preferably in the range of 3 to 7 hours, most preferably in the range of 4 to 6 hours. The retention time is adjusted by circulating the reaction mixture through a reactor, producing a continuous flow reaction, or alternatively through several successive devices, or a combination of both. After reaction, the reaction mixture is discharged into the container.

In the case of no addition of water and alkyl ester of short-chain organic acids having 2, 3 or 5 carbon atoms, derived from biomass of methyl acetate or ethyl acetate, in a container, methyl acetate or ethyl acetate after reaction and acetic acid, formed from the reaction of free fatty acids with methyl acetate or ethyl acetate, partially evaporate, are condensed and distilled to separate methyl acetate or ethyl acetate from acetic acid and obtained methyl acetate or ethyl acetate for reuse as materials for subsequent reaction. The distillation temperature preferably ranges from 60° C. to 85° C., more preferably from 65° C. to 80° C., most preferably from 70° C. to 77° C. The remainder of the product, still containing acetic acid (in the case of acetic acid forming reaction), is vacuum-distilled to remove acetic acid residue and obtain the basic biosolvents. The vacuum distillation temperature preferably ranges from 100 to 150° C., more preferably between 110 to 140° C., most preferably from 120 to 130° C. The vacuum pressure preferably ranges from 16.0 to 8.0 kPa, more preferably from 14.7 to 9.3 kPa, most preferably from 13.3 to 10.7 kPa. The distillation time preferably ranges from 10 to 60 minutes, more preferably from 20 to 50 minutes, most preferably from 30 to 40 minutes.

In the case of no addition of water and alkyl ester of short-chain organic acids having 2, 3 or 5 carbon atoms, derived from biomass of ethyl lactate or ethyl levulinate, in a container, only lactic acid or levulinic acid, formed from the reaction of free fatty acids with ethyl lactate or ethyl levulinate, evaporates and is condensed for processing. Excessive reactive agents, such as ethyl lactate or ethyl levulinate, which has a high boiling point, don't evaporate from the reaction mixture after discharging the mixture from the reactor into the container. The amount of lactic acid or levulinic acid left in the product mixture will be separated by vacuum distillation. The distillation temperature preferably ranges from 100 to 150° C., more preferably from 110 to 140° C., most preferably from 120 to 130° C. The vacuum pressure preferably ranges from 16.0 to 8.0 kPa, more preferably from 14.7 to 9.3 kPa, most preferably from 13.3 to 10.7 kPa. The distillation time preferably ranges from 10 to 60 minutes, more preferably from 20 to 50 minutes, most preferably from 30 to 40 minutes. Lactic acid or levulinic acid is condensed for recovery and processing. The remaining liquid mixture in the distillation equipment is the basic bio solvents.

In the case of addition of water and alkyl ester of short-chain organic acids having 2, 3 or 5 carbon atoms, derived from biomass of methyl acetate or ethyl acetate, the reaction does not produce acetic acid, hence, the separation of these acids should be omitted. Accordingly, in a container, methyl acetate or ethyl acetate residue after reaction and water evaporate and are condensed. The remaining liquid mixture, comprising alkyl ester of fatty acid, triacetin and amounts of methyl acetate or ethyl acetate, is the basic biosolvents. Methyl acetate or ethyl acetate vapor and condensed water will be distilled to separate methyl acetate or ethyl acetate from water, and reused as materials for the next reaction. The distillation temperature preferably ranges from 60° C. to 85° C., more preferably from 65° C. to 80° C., most preferably from 70° C. to 77° C.

In the case of addition of water and alkyl esters of short-chain organic acid having 2, 3 or 5 carbon atoms, derived from biomass of ethyl lactate or ethyl levulinate, which has a high boiling point, there is no presence of ethyl acetate or ethyl levulinate evaporating from the product mixture after reaction when the mixture is discharged from the reactor into a container, and concurrently, the process does not produce acids (C3 or C5), hence, the separation of these acids should be omitted. Therefore, when the reaction is complete, the reactor should be cooled to a suitable temperature to evaporate the water when the product mixture is discharged into the container. The cooling temperature preferably ranges from 90° C. to 140° C., more preferably from 100° C. and 130° C., most preferably from 120° C. to 130° C. Water evaporating from the reaction mixture should be condensed and obtained. The remaining liquid is the basic biosolvents.

The basic biosolvents obtained according to the invention comprises an alkyl ester of a fatty acid, an ester of glycerol, an ester of short-chain organic acid having 2, 3 or 5 carbon atoms.

This basic biosolvents will be formulated into a variety of biosolvents, depending on application requirements, by adding a specified volume of one or more ingredients to adjust the mass ratio of the components in the original biological solvent system. Additional components are those available in the basic biosolvents, for example, alkyl ester of fatty acid, ester of glycerin, alkyl ester of short-chain organic acids having 2, 3 or 5 carbon atoms, derived from biomass. Depending on requirements on compositions of the biosolvent system, one or two of the above-mentioned components may be added, at specified mass ratios, to the basic biosolvents. The addition rate of each of these components added to the basic biosolvents is determined by the difference between the percentage by weight of that component in the formula of the desired biosolvent system and the percentage by mass of that component in the basic biosolvents. For some applications that do not require a strong detergent, a co-solvent which is a dearomatized hydrocarbon solvent can be added to the original solvent system. In addition, to enhance the cleansing effect of the basic biosolvents, additives such as surfactants, co-surfactants, short-chain alcohol (other than methanol) may be added to the basic biosolvents without affecting the safety and environmental friendliness of the biosolvent. Surprisingly, it is found that, with the above-mentioned formulation, from the basic biosolvents, it is possible to make hundreds of different biosolvent formulations, which are safe with the ecological environment and human health, and can be applied in areas such as printing, painting, asphalt, pesticides, industrial and civil hygiene, oil spill handling, etc.

EXAMPLE

The invention will be understood more clearly from the examples below. These examples are for illustrative purposes only but do not limit the scope of protection of the invention.

In the examples from Example 1 to Example 8, the catalyst fed to the reactor is a heterogeneous catalyst produced by dissolving the ore of pyrolusite, whose $MnO_2$ was reduced to MnO, into a solution of $H_2SO_4$ 20%, in 100° C.; removing insoluble impurities, then precipitating filtration with 15% NaHCO3 solution; subsequently, drying the precipitate at 600° C. for 2 h; pressing 1 cm in diameter by extruding machine, drying at 80° C. and heat-treating at 950° C. in the air stream. The catalyst after the preparation is analyzed as percentage by weight of the elements: Mn 36.8%; Si 6.05%; Fe 10.36%; Al 1.2%; 32.6%, also known as heterogeneous catalyst KEYCAT-01. The catalyst has a longevity, which means continuous working time, at least 6 months. After 6 months of work, replace 10% of the used catalyst with a new equivalent catalytic mass.

Example 1

The reaction agent is methyl acetate and inedible vegetable oil or animal fat without added water during the procedure performance.

The procedure is as follows:
Step 1: Heating material to liquefy

Inedible vegetable oil or animal fat (whose acid index is 5 mgKOH/g, mechanical residue<0.1% by weight, water content<0.5% by weight) is heated to liquefy and kept at 55° C.-60° C.

Step 2: Mix the liquid material with the reaction agent methyl acetate

Inedible vegetable oil or animal fat and methyl acetate are simultaneously fed into an agitator, heated to 55-60° C., using superheated steam. Feed rates for inedible vegetable oil or animal fat and methyl acetate are 100 L/hr and 20 L/h respectively, equivalent to the volume ratio of methyl acetate and inedible vegetable oil or animal fat, which is 2:10. At this stirring device, the two materials are mixed together.

Step 3: Conducting inter-esterification reaction (one-pot reaction)

The mixed material is transferred into the heated reactor to a temperature in the range of 220 to 240° C., a pressure in the range of 4.5 to 5.0 MPa, cycled to produce continuous-flow reaction. The total retention time of the reaction mixture in the reactor is 6 hours.

Step 4: Removing organic acids and products with low boiling point

The product obtained after the reaction is brought to the container. Here, due to the high temperature of the product mix, most of the components having a low boiling point such as methyl acetate material remaining after the reaction and a portion of the acetic acid product are evaporated and condensed. Condensed vapor is distilled, and methyl acetate is obtained. The remainder of the product, containing acetic acid, is stripped off acetic acid residue from the product mixture by distillation at a pressure of between 13.3 and 10.7 kPa, at a temperature ranging from 120 to 130° C. for 30 minutes.

Acetic acid is condensed for processing. The remaining liquid is the basic biosolvents.

The obtaining efficiency of the original bio solvent system is 99.5%.

Example 2

The reaction agent is ethyl acetate and inedible vegetable oil or animal fat without added water during the procedure performance.

The procedure is as follows:
Step 1: Heating material to liquefy

Inedible vegetable oil or animal fat (whose acid index is 5 mgKOH/g, mechanical residue<0.1% by weight, water content<0.5% by weight) is heated to liquefy and kept at 70° C.-75° C.

Step 2: Mix the liquid material with the reaction agent ethyl acetate

Inedible vegetable oil or animal fat and ethyl acetate are simultaneously fed into an agitator, heated to 70-75° C., using superheated steam. Feed rates for inedible vegetable oil or animal fat and ethyl acetate are 100 L/hr and 20 L/h respectively, equivalent to the volume ratio of ethyl acetate and inedible vegetable oil or animal fat, which is 2:10. At this stirring device, the two materials are mixed together.

Step 3: Conducting inter-esterification reaction (one-pot reaction)

The mixed material is transferred into the heated reactor to a temperature in the range of 220 to 240° C., a pressure in the range of 4.5 to 5.0 MPa, cycled to produce continuous-flow reaction. The total retention time of the reaction mixture in the reactor is 6 hours.

Step 4: Removing organic acids and products with low boiling point

The product obtained after the reaction is brought to the container. Here, due to the high temperature of the product mix, most of ethyl acetate having a low boiling point remaining after the reaction and a portion of the acetic acid product are evaporated and condensed. The remainder of the product, containing ethyl acetate and acetic acid, is stripped off ethyl acetate and acetic acid residue from the product mixture by distillation under vacuum at a pressure of 13.3 to 10.7 kPa, at a temperature between 120 and 130° C., using saturated steam for 30 minutes. Acetic acid and ethyl acetate are condensed for processing. The remaining liquid is the basic bio solvents.

The ethyl acetate condensate is distilled at a temperature between 75° C. and 77° C. Distilled products are examined for quality and delivered to the intermediate container, before pumping into the container of material, to return to production.

The obtaining rate of the basic biosolvents is 99.3%.

Example 3

The reaction agent is ethyl acetate and waste fatty acid without added water during the procedure performance The procedure is as follows:
Step 1: Heating material to liquefy Waste fatty acid composition (whose acid index is 174 mgKOH/g, mechanical residue<0.1% by weight, water content<0.5% by weight) is heated to liquefy and kept at 70° C.-75° C., in the liquefied material equipment.

Step 2: Mix the liquid material with the reaction agent ethyl acetate

Waste fatty acid and ethyl acetate are simultaneously fed into an agitator, heated to 70-75° C., using superheated steam. Feed rates for waste fatty acid and ethyl acetate are 100 L/h and 20 L/h respectively, equivalent to the volume ratio of ethyl acetate and waste fatty acid composition, which is 2:10. At this stirring device, the two materials are mixed together.

Step 3: Conducting inter-esterification reaction (one-pot reaction)

The mixed material is transferred into the heated reactor to a temperature in the range of 220 to 240° C., a pressure in the range of 4.5 to 5.0 MPa, cycled to produce continuous-flow reaction. The total retention time of the reaction mixture in the reactor is 6 hours.

Step 4: Removing organic acids and products with low boiling point

The product obtained after the reaction is brought to the container. Here, due to the high temperature of the product mix, most of ethyl acetate after the reaction and a portion of the acetic acid product are evaporated and condensed. The remainder of the product, containing ethyl acetate and acetic acid, is stripped off acetic acid residue from the product mixture by distillation under vacuum at a pressure of 13.3 to 10.7 kPa, at a temperature between 120 and 130° C., using saturated steam for 30 minutes.

Acetic acid steam and ethyl acetate steam are condensed for processing. The remaining liquid is the basic biosolvents.

The obtaining efficiency of the basic biosolvents compared to theory is 99.1%.

Example 4

The reaction agent is ethyl acetate and waste fatty acid composition with added water during the procedure performance The procedure is as follows:
Step 1: Heating material to liquefy Waste fatty acid composition (whose acid index is 174 mgKOH/g, mechanical residue<0.1% by weight, water content<0.5% by weight) is heated to liquefy and kept at 70° C.-75° C., in the liquefied material equipment.

Step 2: Mix the liquid material with the reaction agent ethyl acetate

Waste fatty acid, ethyl acetate and water are simultaneously fed into an agitator, heated to 70-75° C., using superheated steam. Feed rates for waste fatty acid, ethyl acetate and water are 100 L/h, 40 L/h and 20 L/h respectively, equivalent to the volume ratio of ethyl acetate, water and waste fatty acid composition, which is 4:2:10. At this stirring device, the three materials are mixed together.

Step 3: Conducting one-pot reaction, including inter-esterification reactions, concurrently with hydrolysis and esterification The mixed material is transferred into the heated reactor to a temperature in the range of 220 to 240° C., a pressure in the range of 4.5 to 5.0 MPa, cycled to produce continuous-flow reaction. The total retention time of the reaction mixture in the reactor is 6 hours.

Step 4: Removing products with low boiling point

The product obtained after the reaction is brought to the container. Here, due to the high temperature of the product mix, most of ethyl acetate remaining after the reaction and water are evaporated. Condensed vapors are distilled to obtain ethyl acetate. The remaining liquid mixture, including ethyl ester of fatty acid, triacetin and ethyl acetate, is the basic biosolvents.

The obtaining efficiency of the basic biosolvents compared to theory is 99.5%.

Example 5

The reaction agent is ethyl lactate and inedible vegetable oil or animal fat without added water during the procedure performance The procedure is as follows:
Step 1: Heating material to liquefy Inedible vegetable oil or animal fat (whose acid index is 5 mgKOH/g, mechanical residue<0.1% by weight, water content<0.5% by weight) is heated to liquefy and kept at 90° C.-95° C., in the liquefied material equipment.

Step 2: Mix the liquid material with the reaction agent ethyl lactate

Inedible vegetable oil or animal fat and ethyl lactate are simultaneously fed into an agitator, heated to 90-95° C., using superheated steam. Feed rates for inedible vegetable oil or animal fat and ethyl lactate are 100 L/hr and 60 L/h respectively, equivalent to the volume ratio of ethyl lactate and inedible vegetable oil or animal fat, which is 6:10. At this stirring device, the two materials are mixed together.

Step 3: Conducting inter-esterification reaction (one-pot reaction)

The mixed material is transferred into the heated reactor to a temperature in the range of 220 to 240° C., a pressure in the range of 4.5 to 5.0 MPa, cycled to produce continuous-flow reaction. The total retention time of the reaction mixture in the reactor is 6 hours.

Step 4: Removing organic acids and products with low boiling point

The product obtained after the reaction is brought to the container. Here, due to the high temperature of the product mix, most of lactate acid is evaporated. Lactic acid vapor is condensed and obtained for processing. The remaining liquid mixture, consisting of ethyl ester of fatty acid, glycerin trilactate, ethyl lactate left over after reaction and lactic acid, is stripped off lactic acid residue from the product mixture by distillation with hot oil at a temperature ranging from 120 to 130° C., under vacuum conditions of 10.7 kPa. Lactic acid vapor is condensed and obtained for processing. The remaining liquid mixture in the distillation equipment, including ethyl ester of fatty acid, glycerin trilactate, ethyl lactate, is the basic biosolvents.

The obtaining efficiency of the original biosystem compared to theory is 99.6%.

Example 6

The reaction agent is ethyl lactate and waste fatty acid without added water during the procedure performance The procedure is as follows:
Step 1: Heating material to liquefy Waste fatty acid composition (whose acid index is 174 mgKOH/g, mechanical residue<0.1% by weight, water content<0.5% by weight) is heated to liquefy and kept at 90° C.-95° C.

Step 2: Mix the liquid material with the reaction agent ethyl lactate

Waste fatty acid composition and ethyl lactate are simultaneously fed into an agitator, heated to 90-95° C., using superheated steam. Feed rates for waste fatty acid composition and ethyl lactate are 100 L/h and 60 L/h respectively, equivalent to the volume ratio of ethyl lactate and waste fatty acid composition, which is 6:10. At this stirring device, the two materials are mixed together.

Step 3: Conducting inter-esterification reaction (one-pot reaction)

The mixed material is transferred into the heated reactor to a temperature in the range of 220 to 240° C., a pressure in the range of 4.5 to 5.0 MPa, cycled to produce continuous-flow reaction. The total retention time of the reaction mixture in the reactor is 6 hours.

Step 4: Removing organic acids and products with low boiling point

The product obtained after the reaction is brought to the container. Here, due to the high temperature of the product mix, most of lactic acid is evaporated, condensed, and obtained for processing. The remainder of the product, containing ethyl ester, fatty acid, glycerin trilactate, ethyl lactate left over after reaction and lactic acid, is stripped off acetic acid residue from the product mixture by distillation under vacuum at a pressure of 10.7 kPa, at a temperature between 120 and 130° C.

The amount of lactic acid will be removed from the liquid mixture. Lactic acid vapor is condensed and obtained for processing. The remaining liquid mixture in the distillation equipment is the basic biosolvents.

The obtaining efficiency of the basic biosolvents compared to theory is 99.4%.

Example 7

The reaction agent is ethyl lactate and waste fatty acid with added water during the procedure performance.

The procedure is as follows:
Step 1: Heating material to liquefy

Waste fatty acid composition (whose acid index is 174 mgKOH/g, mechanical residue<0.1% by weight, water content<0.5% by weight) is heated to liquefy and kept at 90° C.-95° C., in the liquefied material equipment.

Step 2: Mix the liquid material with the reaction agent ethyl lactate and water

Waste fatty acid composition, ethyl lactate and water are simultaneously fed into an agitator, heated to 90-95° C., using superheated steam. Feed rates for waste fatty acid composition, ethyl lactate and water are 100 L/h, 40 L/h and 20 L/h respectively, equivalent to the volume ratio of ethyl lactate, water and waste fatty acid composition, which is 4:2:10. At this stirring device, the three materials are mixed together.

Step 3: Conducting one-pot reaction, including inter-esterification reactions, concurrently with hydrolysis and esterification The mixed material is transferred into the heated reactor to a temperature in the range of 220 to 240° C., a pressure in the range of 4.5 to 5.0 MPa, cycled to produce continuous-flow reaction. The total retention time of the reaction mixture in the reactor is 6 hours.

Step 4: Removing water

When the reaction is complete, cool the reactor to a temperature of between 120° C. and 130° C. and bring the product into containers. Here, since the temperature of the product mixture is higher than the boiling point of water, most of water in the product mixture evaporates. Ethyl lactate residue after reaction does not evaporate because the temperature of the product mixture is lower than the boiling point of ethyl lactate (whose boiling point is around 151° C.-155° C.). As a result, the basic biosolvents is obtained, comprised of a mixture of ethyl ester of fatty acid, glycerin trilactate and ethyl lactate. Condensed water is obtained into the tank for reuse.

The obtaining efficiency of the basic biosolvents is 99.6%.

Example 8

The reaction agent is ethyl levulinate and waste fatty acid with added water during the procedure performance The procedure is as follows:
Step 1: Heating material to liquefy Waste fatty acid composition (whose acid index is 174 mgKOH/g, mechanical residue<0.1% by weight, water content<0.5% by weight) is heated to liquefy and kept at 90° C.-95° C., in the liquefied material equipment.

Step 2: Mix the liquid material with the reaction agent ethyl levulinate and water Waste fatty acid composition, ethyllevulinate and water are simultaneously fed into an agitator, heated to 90-95° C., using superheated steam. Feed rates for waste fatty acid composition, ethyllevulinate and water are 100 L/h, 40 L/h and 20 L/h respectively, equivalent to the volume ratio of ethyl levulinat, water and waste fatty acid composition, which is 4:2:10. At this stirring device, the three materials are mixed together.

Step 3: Conducting one-pot reaction, including inter-esterification reactions, concurrently with hydrolysis and esterification The mixed material is transferred into the heated reactor to a temperature in the range of 220 to 240° C., a pressure in the range of 4.5 to 5.0 MPa, cycled to produce continuous-flow reaction. The total retention time of the reaction mixture in the reactor is 6 hours.

Step 4: Removing products with low boiling point

When the reaction is complete, cool the reactor to a temperature of between 120° C. and 130° C. and bring the product into containers. Here, because the temperature of the product mixture is higher than the boiling point of water, most of water in the product mixture evaporates. Ethyl levulinate residue after reaction does not evaporate because the temperature of the product mixture is lower than the boiling temperature of ethyl levulinate (whose boiling point is 203° C.-205° C.). As a result, the basic biosolvents is obtained, comprised of a mixture of ethyl ester of fatty acid, glycerin trilevulinate and ethyl levulinate. Condensed water is obtained into the tank for reuse.

The obtaining efficiency of the basic biosolvents is 99.4%.

Example 9

Preparation of biolsolvent for the production of pesticides, from the original biosolvent.

Take 1000 mL of the original biosolvent containing 80% by weight of ethyl ester of fatty acid, 10% by weight of glycerin trilevulinate and 10% by weight of ethyl levulinate. Add 4000 mL of ethyl ester of fatty acid. Obtain 5000 mL of a biosolvent containing 96% by weight of ethyl ester of fatty acid, 2% by weight of glycerin trilevulinate and 2% by weight of ethyl levulinate. Use the biosolvent obtained to prepare the oil-emulsive EC pesticide, replacing solvents made of fossil.

Example 10

Preparation of the biosolvent for the production of roller-washing solution, from the original biosolvent.

Take 1000 mL of the original biosolvent containing 80% by weight of ethyl ester of fatty acid, 20% by weight of glycerin trilactate. Add 1000 mL of ethyl ester of fatty acid. Obtain 2000 mL of a biosolvent containing 90% by weight of ethyl ester of fatty acid, 10% by weight of glycerin trilactate. Add 100 ppm D-limonene odorant. Use the biosolvent obtained as roller-washing solution for offset printing, replacing solvents made of fossil.

Obtainable Benefits

Through the examples illustrated above, it is found that the method according to the invention allows the production of a base of organic solvents derived from non-edible vegetable grease or fatty acid mixture, by reaction a pot, using heterogeneous catalysts, ignoring the complex separation and purification stages, does not generate secondary waste. In addition, this method has the advantage of being suitable for the raw materials, not only have high acid but also high content of water without having to undergo the process of refining raw materials. From the original biological solvent system, it is possible to prepare a variety of biological solvents of various compositions, depending on the application requirements, by adding a defined volume of one or more ingredients, Adjust the mass ratio of the components in the original biological solvent system.

The invention claimed is:

1. A process for production of basic biosolvents from inedible vegetable oil or animal fat or waste fatty acid, by one-pot reaction, using heterogeneous catalysts comprising the steps of:
heating inedible vegetable oil or animal fat or waste fatty acid composition for the liquefying of raw materials;
mixing the liquid material with one of the reactants, the alkyl ester of short-chain organic acids having 2, 3 or 5 carbon atoms, derived from biomass, in the mixing apparatus;
conducting one-pot reaction including inter-esterification reaction or inter-esterification reactions simultaneously with hydrolysis and the above-mentioned esterification reaction in the presence of heterogeneous catalysts at the temperature ranges from 220° C. to 240° C., and the pressure is in the range of 4.5-5.0 MPa; and
removing water and short-chain organic acids having 2, 3 or 5 carbon atoms as by-products and components with low boiling point, in order to obtain the basic biosolvents, wherein the basic biosolvents being a system which is a mixture of alkyl esters of fatty acids, trieste glycerin, esters of short-chain organic acids having 2, 3 or 5 carbon atoms, derived from biomass, as components with high boiling point.

2. The process of claim 1, wherein the mixing ratio based on the volume of alkyl esters and inedible vegetable oil or animal fat or waste fatty acid composition is in the range of 2:10 to 6:10.

3. The process of claim 1, wherein water may be added to the mixer with the ratio of water and inedible vegetable oil or animal fat or waste fatty acid composition in the range of 1:10 to 4:10.

4. The process of claim 1, wherein alkyl esters of short-chain organic acids having 2, 3 or 5 carbon atoms, derived from biomass, comprise methyl or ethyl esters of acetic acid, lactic acid, levulinic acid.

5. The process of claim 1, wherein the heterogeneous catalyst is a solid catalyst produced by dissolving the ore of pyrolusite, whose $MnO_2$ was reduced to MnO, into a solution of $H_2SO_4$ 20%, in 100° C.; removing insoluble impurities, then precipitating filtration with 15% $NaHCO_3$ solution; subsequently, drying the precipitate at 600° C. for 2 h; pressing 1 cm in diameter by extruding machine, drying at 80° C. and heat-treating at 950° C. in the air stream, the catalyst after the preparation is analyzed as percentage by weight of the elements: Mn 36.8%; Si 6.05%; Fe 10.36%; Al 1.2%; O 32.6%.

6. A basic biosolvents comprises a mixture of alkyl esters of fatty acids, ester of glycerin, ester of short-chain organic acids having 2 or 3 or 5 carbon atoms, suitable for the preparation of various biosolvents having different elements, depending on application requirements.

7. The basic biosolvents of claim 6 comprises methyl ester of fatty acid and triacetine.

8. The basic biosolvents of claim 6 comprises ethyl ester of fatty acid and triacetin.

9. The basic biosolvents of claim 6 comprises ethyl ester of fatty acid, ethyl lactate, glycerin trilactate.

10. The basic biosolvents of claim 6 comprises ethyl ester of fatty acid, ethyl levulinate and glycerin trilevulinate.

11. The process of claim 2, wherein water may be added to the mixer with the ratio of water and inedible vegetable oil or animal fat or waste fatty acid composition in the range of 1:10 to 4:10.

12. The process of claim 2, wherein alkyl esters of short-chain organic acids having 2, 3 or 5 carbon atoms, derived from biomass, comprise methyl or ethyl esters of acetic acid, lactic acid, levulinic acid.

13. The process of claim 3, Therein alkyl esters of short-chain organic acids having 2, 3 or 5 carbon atoms, derived from biomass, comprise methyl or ethyl esters of acetic acid, lactic acid.

14. The process of claim 2, wherein the heterogeneous catalyst is a solid catalyst produced by dissolving the ore of pyrolusite, whose $MnO_2$ was reduced to MnO, into a solution of $H_2SO_4$ 20%, in 100° C.; removing insoluble impurities, then precipitating filtration with 15% $NaHCO_3$ solution; subsequently, drying the precipitate at 600° C. for 2 h; pressing 1 cm in diameter by extruding machine, drying at 80° C. and heat-treating at 950° C. in the air stream, the catalyst after the preparation is analyzed as percentage by weight of the elements: Mn 36.8%; Si 6.05%; Fe 10.36%; Al 1.2%; O 32.6%.

15. The process of claim 3, wherein the heterogeneous catalyst is a solid catalyst produced by dissolving the ore of pyrolusite, whose $MnO_2$ was reduced to MnO, into a solution of $H_2SO_4$ 20%, in 100° C.; removing insoluble impurities, then precipitating filtration with 15% $NaHCO_3$ solution; subsequently, drying the precipitate at 600° C. for 2 h; pressing 1 cm in diameter by extruding machine, drying at 80° C. and heat-treating at 950° C. in the air stream, the catalyst after the preparation is analyzed as percentage by weight of the elements: Mn 36.8%; Si 6.05%; Fe 10.36%; Al 1.2%; O 32.6%.

16. The process of claim 4, wherein the heterogeneous catalyst is a solid catalyst produced by dissolving the ore of pyrolusite, whose $MnO_2$ was reduced to MnO, into a solution of $H_2SO_4$ 20%, in 100° C.; removing insoluble impurities, then precipitating filtration with 15% $NaHCO_3$ solution; subsequently, drying the precipitate at 600° C. for 2 h; pressing 1 cm in diameter by extruding machine, drying at 80° C. and heat-treating at 950° C. in the air stream, the catalyst after the preparation is analyzed as percentage by weight of the elements: Mn 36.8%; Si 6.05%; Fe 10.36%; Al 1.2%; O 32.6%.

17. The process of claim 1, wherein alkyl esters of short-chain organic acids having 2, 3 or 5 carbon atoms, derived from biomass, comprise methyl acetate, ethyl acetate, ethyl lactate, and ethyl levulinate.

18. The process of claim 2, wherein alkyl esters of short-chain organic acids having 2, 3 or 5 carbon atoms, derived from biomass, comprise methyl acetate, ethyl acetate, ethyl lactate, and ethyl levulinate.

19. The process of claim 3, wherein alkyl esters of short-chain organic acids having 2, 3 or 5 carbon atoms, derived from biomass, comprise methyl acetate, ethyl acetate, ethyl lactate, and ethyl levulinate.

* * * * *